United States Patent
Trygubova

(10) Patent No.: US 10,187,505 B1
(45) Date of Patent: Jan. 22, 2019

(54) VOICE-ACTIVATED CALL PICK-UP FOR MOBILE DEVICE

(71) Applicant: Dish Network L.L.C., Englewood, CO (US)

(72) Inventor: Svitlana Trygubova, Lakewood, CO (US)

(73) Assignee: DISH NETWORK, L.L.C., Englewood, CO (US)

( * ) Notice: Subject to any disclaimer, the term of this patent is extended or adjusted under 35 U.S.C. 154(b) by 0 days.

(21) Appl. No.: 15/853,019

(22) Filed: Dec. 22, 2017

(51) Int. Cl.
*H04W 4/16* (2009.01)
*H04M 1/60* (2006.01)
*G10L 15/00* (2013.01)
*H04W 4/48* (2018.01)

(52) U.S. Cl.
CPC .......... *H04M 1/6091* (2013.01); *G10L 15/00* (2013.01); *H04W 4/16* (2013.01); *H04W 4/48* (2018.02)

(58) Field of Classification Search
CPC ....... H04M 1/6091; H04M 4/16; H04W 4/48; G10L 15/00
USPC ..................................... 455/569.2
See application file for complete search history.

(56) References Cited

U.S. PATENT DOCUMENTS

| | | | | |
|---|---|---|---|---|
| 6,240,303 B1 * | 5/2001 | Katzur | ................. | H04M 1/271 379/88.01 |
| 7,327,258 B2 * | 2/2008 | Fast | ..................... | G01S 5/0018 340/572.1 |
| 7,505,784 B2 | 3/2009 | Barbera | | |
| 7,937,075 B2 * | 5/2011 | Zenner | ................ | H04M 1/6075 455/418 |
| 8,145,199 B2 * | 3/2012 | Tadayon | ............. | H04B 5/0062 455/418 |
| 8,213,962 B2 * | 7/2012 | Carr | ..................... | H04B 5/0031 455/26.1 |
| 8,270,933 B2 | 9/2012 | Riemer et al. | | |
| 8,315,617 B2 * | 11/2012 | Tadayon | ................ | H04W 4/50 455/418 |
| 8,787,590 B2 * | 7/2014 | Watson | ..................... | B60R 1/12 381/122 |
| 8,787,949 B2 * | 7/2014 | Sumcad | .................. | H04W 4/12 455/412.2 |
| 8,831,677 B2 * | 9/2014 | Villa-Real | ............... | H04M 1/66 455/552.1 |
| 8,880,047 B2 * | 11/2014 | Konicek | ........... | H04M 1/72513 455/417 |
| 9,014,661 B2 * | 4/2015 | decharms | ............. | H04W 4/021 455/404.2 |
| 9,198,113 B2 | 11/2015 | Rajeevalochana et al. | | |
| 9,229,623 B1 * | 1/2016 | Penilla | .................... | G06Q 20/18 |
| 9,374,423 B2 | 6/2016 | Crosbie et al. | | |
| 9,633,660 B2 * | 4/2017 | Haughay | ................ | G10L 15/22 |

(Continued)

*Primary Examiner* — Hai V Nguyen
(74) *Attorney, Agent, or Firm* — Perkins Coie LLP

(57) ABSTRACT

Disclosed embodiments are directed an application program configured to run on a user's mobile device can allow voice-activated call pick-up to the user, without the user having to use his or her hands for picking up the call. For example, the application program can initially be trained to a user's voice command. When an incoming call is received at the mobile device, the user can pick up the call by issuing a voice command. In some embodiments, the application program can determine whether to allow voice-activated pick-up of calls based on data collected from multiple sensors associated with the vehicle, the mobile device, or a remote source.

20 Claims, 3 Drawing Sheets

(56) References Cited

U.S. PATENT DOCUMENTS

| | | | |
|---|---|---|---|
| 9,820,120 B2* | 11/2017 | decharms | H04W 4/021 |
| 10,049,663 B2* | 8/2018 | Orr | G06F 17/30026 |
| 10,049,668 B2* | 8/2018 | Huang | G10L 15/285 |
| 2002/0128000 A1 | 9/2002 | do Nascimento, Jr. | |
| 2003/0013501 A1* | 1/2003 | Malhotra | H04M 1/6083 |
| | | | 455/569.2 |
| 2007/0121853 A1* | 5/2007 | Dawson | G10L 13/043 |
| | | | 379/142.01 |
| 2007/0142024 A1* | 6/2007 | Clayton | H04H 20/08 |
| | | | 455/403 |
| 2011/0021213 A1* | 1/2011 | Carr | H04B 5/0031 |
| | | | 455/456.4 |
| 2011/0065375 A1* | 3/2011 | Bradley | H04M 1/72577 |
| | | | 455/1 |
| 2012/0054028 A1* | 3/2012 | Tengler | G01C 21/3697 |
| | | | 705/14.49 |
| 2012/0172012 A1* | 7/2012 | Sumcad | H04W 4/12 |
| | | | 455/414.1 |
| 2013/0150004 A1* | 6/2013 | Rosen | H04W 8/22 |
| | | | 455/414.1 |
| 2013/0274997 A1* | 10/2013 | Chien | G06F 17/00 |
| | | | 701/36 |
| 2013/0307665 A1* | 11/2013 | Wang | H04M 1/7253 |
| | | | 340/5.1 |
| 2014/0052680 A1* | 2/2014 | Nitz | G06N 5/02 |
| | | | 706/46 |
| 2014/0052681 A1* | 2/2014 | Nitz | H04L 51/02 |
| | | | 706/46 |
| 2014/0059263 A1* | 2/2014 | Rosenberg | G06F 1/1632 |
| | | | 710/303 |
| 2014/0071886 A1* | 3/2014 | Monte | H04B 7/18517 |
| | | | 370/316 |
| 2014/0162598 A1* | 6/2014 | Villa-Real | H04M 1/66 |
| | | | 455/411 |
| 2014/0309813 A1* | 10/2014 | Ricci | B60Q 1/00 |
| | | | 701/2 |
| 2014/0368601 A1* | 12/2014 | decharms | H04W 4/021 |
| | | | 348/14.02 |
| 2015/0054639 A1* | 2/2015 | Rosen | G06K 9/00785 |
| | | | 340/439 |
| 2015/0262134 A1* | 9/2015 | Daley | G06Q 10/20 |
| | | | 705/305 |
| 2015/0288802 A1* | 10/2015 | Medina | H04M 1/72577 |
| | | | 455/418 |
| 2016/0150070 A1* | 5/2016 | Goren | H04W 4/029 |
| | | | 455/404.2 |
| 2016/0192166 A1* | 6/2016 | decharms | H04W 4/021 |
| | | | 348/14.02 |
| 2017/0300053 A1* | 10/2017 | Wengreen | G05D 1/0088 |
| 2018/0173223 A1* | 6/2018 | Doane | B60W 30/08 |
| 2018/0201285 A1* | 7/2018 | Brooks | B61L 3/008 |

* cited by examiner

VOICE-ACTIVATED CALL PICK-UP FOR MOBILE DEVICE

BACKGROUND

Ubiquitous mobile communications devices, such as cellular phones, pagers, tablet devices, wearable devices, and personal digital assistants ("PDAs"), have made it easier to reach a user regardless of the user's location. As long as the user has network connectivity, e.g., via Wi-Fi, satellite, or cellular networks, he or she is able to receive calls. But, there can be times when a user misses a call because interacting with the mobile device is inconvenient or impossible. If a user is performing a task that requires both hands, or complete focus of the user, then the user may not be able to interact with the mobile device to pick up a call. For example, if a user is driving a vehicle when the mobile device rings, then it is unsafe for the user to pick up the call.

Although there are currently some solutions that allow a user to use a mobile device without having to physically hold the mobile device, these solutions still require the user to interact with the mobile device. For example, one solution provides a headset or a speakerphone function so that the user driving a vehicle does not have to hold the mobile device during a call. However, the user is still required to interact with the mobile device to pick up the call and thereafter activate the headset/speakerphone.

Another solution can be the use of a hands-free Bluetooth headset or an integrated Bluetooth functionality included in the vehicle. But, even with these solutions, the user has to at least press one button to pick up the call. This can lead to unsafe driving, particularly when the user is driving in rocky terrain, crowded streets, bad weather, roads with potholes, narrow lanes under construction, or any other road/environmental conditions that requires the undivided attention of the driver. Accordingly, there is a need for systems that allow drivers to pick up calls while driving a vehicle without compromising their safety.

SUMMARY

A method for automated sensor-based communication using a mobile device, the method comprising: receiving first data from a first sensor; determining from the first data that the mobile device is located within a vehicle; receiving second data from a second sensor; determining from the second data that the vehicle is moving; receiving third data from a third sensor; determining from the third data an absence of interaction with one or more physical inputs of the mobile device; receiving an indication of an incoming telephonic communication being received by the mobile device; automatically activating a microphone operatively coupled to the mobile device; receiving one or more voice commands, the one or more voice commands including a command to connect the incoming telephonic communication; connecting the incoming telephonic communication via the microphone; receiving an indication that the mobile device disconnected the incoming telephonic communication; determining from the third data a presence of interaction with the one or more physical inputs of the mobile device; and disabling the microphone operatively coupled to the mobile device.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE DRAWINGS

Figure 1:
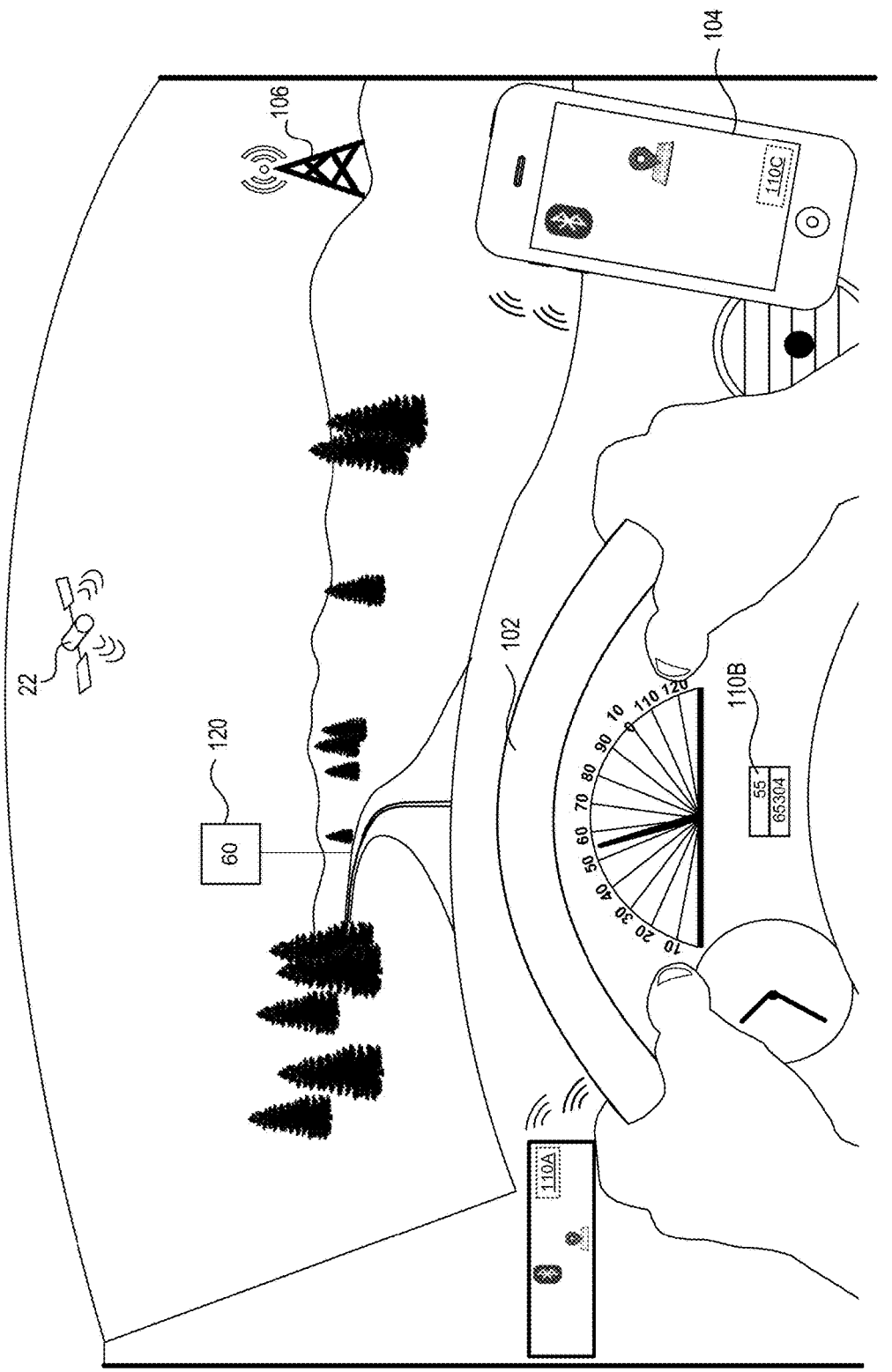
FIG. 1 illustrates a representative environment of operation of some embodiments of the disclosed technology.

The following detailed description of the invention is merely exemplary in nature and is not intended to limit the invention or the application and uses of the invention. Furthermore, there is no intention to be bound by any theory presented in the preceding background or the following detailed description.

The various embodiments described herein provide apparatus, systems and methods generally related to voice-activated call pick-up for a user driving a vehicle. In some embodiments, an application program configured to run on a user's mobile device can allow voice-activated call pick-up to the user, without the user having to use his or her hands for picking up the call. For example, the application program can initially be trained to a user's voice command. When an incoming call is received at the mobile device, the user can pick up the call by issuing a voice command. In some embodiments, the application program can determine whether to allow voice-activated pick-up of calls based on data collected from multiple sensors. For example, the method includes receiving (e.g., from a first sensor) first data for determining that the mobile device and the user are located within a vehicle; receiving (from a second sensor) second data for determining that the vehicle is moving; and receiving (from a third sensor) third data representing an absence of interaction with one or more physical inputs of the mobile device. Upon receiving an indication of an incoming telephonic communication being received by the mobile device, the method includes activating a microphone operatively coupled to the mobile device and receiving one or more voice commands from the user to connect the incoming telephonic communication. Subsequently, after receiving an indication that the mobile device disconnected the incoming telephonic communication, the method includes determining from the third data a presence of interaction with the one or more physical inputs of the mobile device and disabling the microphone operatively coupled to the mobile device.

In some embodiments, the first data collected from a first sensor can include an indication that the mobile device is located within a vehicle. Such an indication can be sent by the electronic circuitry inside the vehicle informing the mobile device over a short-range wireless data connection (e.g., Bluetooth) that the mobile device is inside the vehicle. In some embodiments, such indication can be in the form of audible inputs (e.g., a user can select a "vehicle" mode in the application program) indicating that the mobile device is inside a vehicle. In some embodiments, the first data from the first sensor can include the GPS coordinates received from the mobile device. The GPS coordinates received from the mobile device can be determined in a variety of ways. For example, the electronic circuitry inside the vehicle can provide the GPS coordinates of the vehicle to the mobile device. Accordingly, the application program can use the GPS coordinates of the vehicle to estimate the location of the mobile device, based on the mobile device being located within known GPS coordinate boundaries of the vehicle. As another example, the GPS coordinates of the mobile device may be based on processing one or more received wireless signals, e.g., WiFi/wireless triangulation from a WiFi hotspot or a geostationary satellite in orbit.

In some embodiments, the second data collected from a second sensor can include an indication that the vehicle is moving. For example, a driver may interact with one or more input devices (such as displays) operatively connected to the mobile device to confirm/select user as driver of a vehicle. As another example, the application program can receive information (from the circuitry inside the vehicle) over a Bluetooth connection about the user getting inside the vehicle from a sensor located in the driver-side door. As yet another example, the application program can receive information (from the circuitry inside the vehicle) over a Bluetooth connection that the engine of the vehicle is running.

In some embodiments, the application program can determine the position/location information of the mobile device with respect to the vehicle, e.g., if it is on the console, on the passenger seat, in the driver's pocket, inside a bag/purse placed on the floor or a seat of the vehicle, etc. using proximity sensors coupled to the mobile device.

In some embodiments, the third data collected from a third sensor can include an indication of an absence of interaction with one or more physical inputs of the mobile device. For example, the application program can receive information (from the circuitry inside the vehicle) over a Bluetooth connection receive information (from the circuitry inside the vehicle) indicating the absence of interaction with one or more physical inputs of the mobile device. In some embodiments, the application program can self-sense a speed or an acceleration of the mobile device by one or more sensors of the mobile device such as a GPS receiver, an accelerometer, or a gyroscope. Further, the circuitry inside the vehicle can be any vehicle-related circuitry such as ignition circuitry, circuitry for operating windshield wipers, circuitry for operating traction control, circuitry for operating lights of the vehicle, circuitry for operating air conditioner of the vehicle, circuitry for calculating a speed or an acceleration of the vehicle. Thus, according to disclosed embodiments, the third data can be one of: a geographical location of the vehicle, a road type associated with the vehicle, or a weather associated with the vehicle. Also, the third sensor may include at least one of: a GPS receiver, an accelerometer, or a gyroscope, a barometer, or a compass. The road type associated with the vehicle may indicate whether the vehicle is on a congested road, an uncongested road, a highway, a city street, a pedestrian zone, a hospital, or a school zone. The third data can also include: a weather event or condition associated with the vehicle (e.g., snow on the road, as reported via Bluetooth, sensed by windshield wiper sensor, or reported by traction control).

In some embodiments, the disclosed application program matches the attributes set by the user with the first data, second data, third data collected from the first sensor, the second sensor, and the third sensor respectively. Upon detecting a successful match, the application program causes an incoming call to be picked up by a voice command instead of having to press any button on the mobile device. (In some cases, a user may desire to have the voice-activated call pick-up functionality to be always turned on, or never turned on. In such cases, no matching is necessary.) A user may set any combination of attributes of speed and driving location for the voice-activated call pickup to be operable. For example, a combination can be a vehicle speed of 55 mph and the driving location being a highway. In another scenario, a user may set attributes corresponding to a vehicle speed of 10 mph and the driving location being mountainous/hilly terrain. In some implementations, the user may specify road conditions as attributes for voice-activated call pick-up. Thus, a user may set the driving conditions as rocky or bumpy for the voice-activated call pick-up functionality to operate. In another implementation, a user may specify a weather type for the voice-activated call pick-up functionality to operate. Thus, if the application program determines that the weather conditions where the vehicle is being driven correspond to a weather (e.g., rainy, stormy, or snowy) set by the user, then the voice-activated call pick-up may be turned on.

FIG. 1 illustrates a representative environment of operation of some embodiments of the disclosed technology. In particular, FIG. 1 shows a partial view of a user driving a vehicle 102 and a mobile device 104 communicating with one or more sensors located inside the vehicle or outside the vehicle. For example, an application program running on mobile device 104 receives first data 110A from a first sensor located inside the vehicle, second data 110B from a second sensor located inside the vehicle, and third data 110C from a third sensor coupled to the mobile device. It will be appreciated that the disclosed embodiments impose no restriction on the location of the sensors. That is, in alternate embodiments, sensors associated with the first data 110A, the second data 110B, or the third data 110C may be located in any one of: the mobile device 104, the vehicle 102, or associated with external networks (e.g., a geostationary satellite 122 in orbit, and/or a cellular tower 106). Examples of mobile device 104 can include a mobile phone, a tablet computer, a mobile media device, a mobile gaming device, or a wearable device such as a smartwatch. In FIG. 1, a sign 120 on the on the road where the vehicle is moving indicates the speed limit on the road to be 60 mph.

In some embodiments, the first data 110A collected from a first sensor can include an indication that the mobile device 104 is located within vehicle 102. Such an indication can be sent by the electronic circuitry inside the vehicle 102 informing the mobile device 104 over a Bluetooth connection that the mobile device 104 is inside the vehicle 102. In some embodiments, such indication can be in the form of physical/audible inputs (e.g., a user can select a "vehicle" mode in the application program) indicating that the mobile device 104 is inside vehicle 102.

In some embodiments, the second data 110B collected from a second sensor can include an indication that the vehicle 102 is moving. For example, a driver may interact with one or more input devices (such as displays) operatively connected to the mobile device 104 to confirm/select user as driver of vehicle 102. As another example, the application program can receive information (from the circuitry inside the vehicle 102) over a Bluetooth connection about the user getting inside vehicle 102 from a sensor located in the driver-side door. As yet another example, the application program can receive information (from the circuitry inside the vehicle) over a Bluetooth connection that the engine of the vehicle 102 is running. Another example can be the application program receiving information from a camera located on the vehicle indicating that the vehicle is moving. In some examples, the gyroscope or accelerometer located on the mobile device can determine that the vehicle is moving and convey that information to the application program.

In some embodiments, the third data 110C collected from a third sensor can include an indication that the user is unable to interact with one or more physical inputs of the mobile device 104. In some embodiments, the application program can self-sense a speed or an acceleration of the mobile device 104 by one or more sensors of the mobile device 104 such as a GPS receiver, an accelerometer, or a gyroscope. Further, the circuitry inside the vehicle 102 can be any vehicle-related circuitry such as ignition circuitry, circuitry for operating windshield wipers, circuitry for operating traction control, circuitry for operating lights of the vehicle, circuitry for operating air conditioner of the vehicle 102, circuitry for calculating a speed or an acceleration of the vehicle 102. Thus, according to disclosed embodiments, the third data 110C can be one of: a speed of the vehicle 102, a geographical location of the vehicle 102, a road type associated with the vehicle 102, or a weather associated with the vehicle 102. Also, the third sensor may include at least one of: a GPS receiver, an accelerometer, or a gyroscope, a barometer, or a compass. The road type associated with the vehicle 102 may indicate whether the vehicle 102 is on a congested road, an uncongested road, a highway, a city street, a pedestrian zone, a hospital, or a school zone. The third data 110C can also include: a weather event or condition associated with the vehicle 102 (e.g., snow on the road, as reported via Bluetooth, sensed by windshield wiper sensor, or reported by traction control).

When an incoming telephonic communication is received at mobile device 104, the application program automatically activates a microphone coupled to the mobile device 104. Then, the application program waits for a user to say one or more voice commands to connect to the incoming telephonic communication. Upon identifying the voice command from the user, the application program connects the incoming telephonic communication via the microphone of the mobile device 104. When the user or the caller hangs up the telephonic communication, the application program receives an indication from the mobile device that disconnected the telephonic communication. The application program then determines from the third data 110C that there is a presence of interaction with the one or more physical inputs of the mobile device. For example, the application program may receive a communication from the circuitry inside the vehicle 102 that the speed of the vehicle 102 is zero or less than 10 miles/hr, or that the ignition of the vehicle 102 is turned off. Then, the application program disables the microphone operatively coupled to the mobile device 104, thereby turning off the functionality for receiving voice-activated calls.

Communications between mobile device 104 and tower 106 can be any combination of local area and/or wide area networks, using wired and/or wireless communication systems. The networks could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over the one or more networks may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Communications between mobile device 104 and satellite 122 can employ similar technologies.

Figure 2:
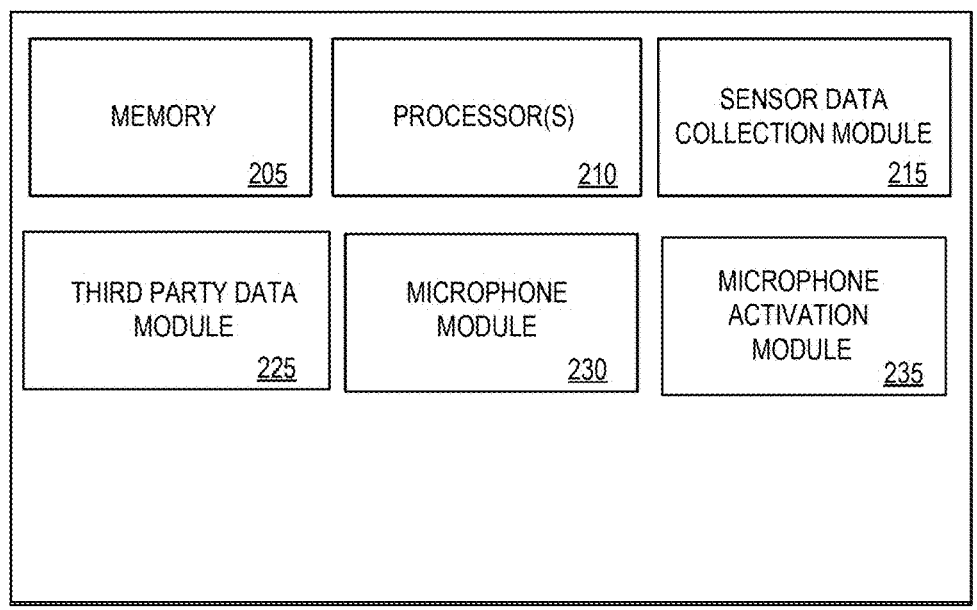
FIG. 2 illustrates an embodiment of the architecture of a mobile device in accordance with some embodiments of the disclosed technology.

FIG. 2 illustrates an embodiment of the architecture of a mobile device in accordance with some embodiments of the disclosed technology. FIG. 2 illustrates a set of components within the mobile device according to one or more embodiments of the present disclosure. According to the embodiments shown in FIG. 2, the mobile device can include memory 205, one or more processors 210, sensor data collection module 215, third party data module 225, microphone module 230, and microphone activation module 235. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of sensor data collection module 215, third party data module 225, microphone module 230, and microphone activation module 235. Generally, memory 205 can include any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Sensor Data collection module 215 provides capabilities for receiving/calculating the first data, the second data, and the third data respectively from the first sensor, the second sensor, and the third sensor. The first data indicates that the mobile device is located within a vehicle. The second data indicates that the vehicle is moving. The third data indicates a lack or absence of interaction with one or more physical inputs (e.g., keyboard, screen, etc.) of the mobile device. The first sensor, the second sensor, or the third sensor can be located on the mobile device, the vehicle, or can be any other suitable sensor from which the mobile device can collect information. According to disclosed embodiments, there are no restrictions on the type, location, or manufacturer of the first sensor, the second sensor, or the third sensor.

Third party data module 225 can include data received from third parties via their application programming interfaces (APIs), application programs, etc. For example, in some implementations, the disclosed application program can receive information from a third party pertaining to the weather. In some implementations, the disclosed application program can provide information to the user's vehicle insurance provider informing the provider about the usage of the voice-activated calling by the user. This information may be used by the provider to assess the user's driving habits in lowering insurance premiums. In some embodiments, the application program can receive information (e.g., from proprietary or publicly-accessible geographic databases) about the road (e.g., a type of road and/or a location of the road) on which the vehicle is moving.

Microphone module 230 allows the application program to receive the user's voice communications during a call (e.g., from a microphone coupled to the mobile device). The microphone module 230 includes analog/digital circuitry and drivers for operation of the microphone coupled to the mobile device.

Microphone activation module 235 allows the user to activate the microphone to receive a voice command causing the incoming call to be answered. The voice command can be a specific string of characters or words that can be identified/recognized by the application program. For example, the application program can be trained to identify certain voice commands for activating the microphone. The microphone may be activated automatically by the incoming call and then may "listen" for the voice commands.

Figure 3:
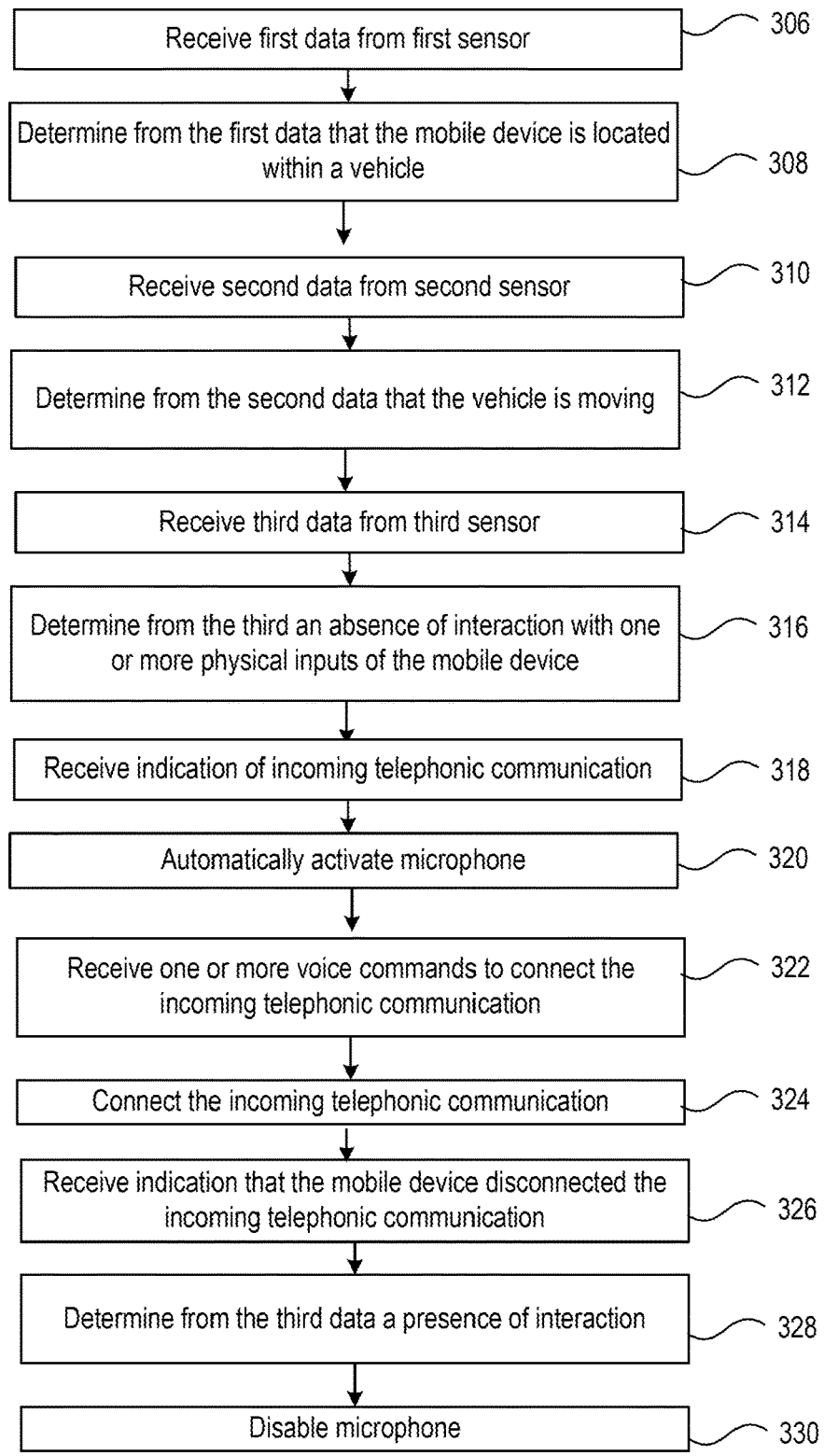
FIG. 3 illustrates a process flow associated with voice-activated call pick-up for a mobile device.

FIG. 3 illustrates a process flow associated with voice-activated call pick-up of an incoming telephonic communication for a mobile device. In some embodiments, steps associated with the process flow can be implemented by an application program configured to run on a user's mobile device. At step 306, the process receives a first data from a first sensor and determines (at step 308) from the first data that the mobile device is located within a vehicle. At step 310, the process receives second data from a second sensor and determines (at step 312) from the second data that the vehicle is moving. For example, a driver may interact with one or more input devices (such as displays) operatively connected to the mobile device to confirm/select user as driver of a vehicle. At step 314, the process receives third data from a third sensor and determines (at step 316) from the third data an absence of interaction with one or more physical inputs of the mobile device. For example, the application program can receive information (from the circuitry inside the vehicle) over a Bluetooth connection that the user is unable to interact with one or more physical inputs of the mobile device. The mobile device can be configured to run an operating system and include additional programs with instructions for operating the one or more physical inputs.

Examples of operating systems running on the user's mobile device can be MICROSOFT WINDOWS®, ANDROID®, or IOS®. Upon receiving information for an incoming call, the application program activates (at step 314) the microphone coupled to the mobile device. The application program receives an indication of an incoming telephonic communication at step 318 and activates the microphone at step 320. At step 322, the application program detects whether a voice command was received (via the microphone), e.g., within a predetermined time interval. In some implementations, the predetermined time interval can be set by a user to a maximum number of rings that the application program will wait for receiving a voice command (e.g., "pick up") from the user. The voice command from the user can be a specific string of characters or words that can be identified/recognized by the application program, after the user has trained the application program to recognize the voice command. There is no restriction on the language or the number of words in the voice command.

Further, the voice command may not have any literal meaning but can be used as a command by the user to instruct the application program to pick up an incoming call. Typically, the application program can undergo a prior training of recognizing the voice command so that the application program is able to identify/recognize the voice command and pick up the call. The application program connects to the incoming telephonic communication at step 324 via the microphone. The process receives (at step 326) an indication that the mobile device disconnected the incoming telephonic communication. At step 328, the process determines from the third data that the user is able to interact with the mobile device. For example, the process determines that from a gyroscope coupled to the mobile device that the speed of the mobile device is zero or below a certain threshold (e.g., 10 miles/hr). Alternatively, the process may receive a message from the circuitry within the vehicle that the vehicle has come to a standstill, and/or that the driver-side door is open. At step 330, the process disables the microphone on the mobile device.

In some scenarios, it is possible that the application program does not receive the voice command from the user within the predetermined time interval or, the application program is not able to recognize the voice command (even if the voice command was received within the predetermined time interval). In such scenarios, the application program allows a user to manually pick up the call. If the application program detects that the user has not manually picked up the call within a certain time interval, the application program can divert the incoming call to a voicemail associated with the user.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for automated sensor-based communication using a mobile device, the method comprising:
    receiving first data from a first sensor;
    determining from the first data that the mobile device is located within a vehicle;
    receiving second data from a second sensor;
    determining from the second data that the vehicle is moving;
    receiving third data from a third sensor;
    determining from the third data an absence of interaction with one or more physical inputs of the mobile device;
    receiving an indication of an incoming telephonic communication being received by the mobile device;
    automatically activating a microphone operatively coupled to the mobile device;
    receiving one or more voice commands, the one or more voice commands including a command to connect the incoming telephonic communication;
    connecting the incoming telephonic communication via the microphone;
    receiving an indication that the mobile device disconnected the incoming telephonic communication;
    determining from the third data a presence of interaction with the one or more physical inputs of the mobile device; and
    disabling the microphone operatively coupled to the mobile device.

2. The method of claim 1, wherein the first data from the first sensor comprises: short-range wireless communication data connecting the vehicle with the mobile device indicating that the mobile device is located within the vehicle or audible data indicating that the mobile device is located within the vehicle.

3. The method of claim 2, wherein the first data from the first sensor comprises GPS coordinates received from the mobile device.

4. The method of claim 3, wherein the GPS coordinates received from the mobile device are based on an estimated location of the mobile device within the vehicle.

5. The method of claim 3, wherein the GPS coordinates received from the mobile device are based on processing one or more received wireless signals.

6. The method of claim 1, wherein the second data from the second sensor comprises: communication data connecting the vehicle with the mobile device indicating a speed of the vehicle or communication data connecting the vehicle with the mobile device indicating that the engine of the vehicle is running.

7. The method of claim 1, wherein the third data from the third sensor comprises: short-range wireless communication data connecting the vehicle with the mobile device indicating the absence of interaction with the one or more physical inputs of the mobile device or self-sensing data received from the mobile device indicating the absence of interaction with the one or more physical inputs of the mobile device.

8. The method of claim 1, wherein the mobile device is electronically coupled to at least one of: ignition circuitry of the vehicle, circuitry for operating windshield wipers of the vehicle, circuitry for operating traction control of the vehicle, circuitry for operating lights of the vehicle, circuitry for operating air conditioner of the vehicle, or circuitry for calculating a speed or an acceleration of the vehicle.

9. The method of claim 1, wherein the first sensor, the second sensor, or the third sensor are located on the mobile device and comprises: a GPS receiver, an accelerometer, or a gyroscope, a barometer, or a compass.

10. The method of claim 1, wherein the third data comprises: a geographical location of the vehicle, a road type associated with the vehicle, or a weather associated with the vehicle.

11. The method of claim 1, wherein the command to connect the incoming telephonic communication is received from the user within a predetermined time interval, further comprising:
    in an event of not receiving the command to connect the incoming telephonic communication within the predetermined time interval or not recognizing the command, the mobile device not connecting the incoming telephonic communication.

12. The method of claim 11, wherein the mobile device not connecting the incoming telephonic communication comprises: allowing the user to manually connect the incoming telephonic communication or diverting the incoming telephonic communication to voicemail.

13. An electronic mobile device for automated sensor-based communication comprising:
    one or more processors; and
    memory storing instructions thereon which cause the one or more processors to:
        receive first data from a first sensor;
        determine from the first data that the mobile device is located within a vehicle;
        receive second data from a second sensor;
        determine from the second data that the vehicle is moving;
        receive third data from a third sensor;
        determine from the third data an absence of interaction with one or more physical inputs of the mobile device;
        receive an indication of an incoming telephonic communication being received by the mobile device;
        automatically activate a microphone operatively coupled to the mobile device;
        receive one or more voice commands, the one or more voice commands including a command to connect the incoming telephonic communication;
        connect the incoming telephonic communication via the microphone;

receive an indication that the mobile device disconnected the incoming telephonic communication;
determine from the third data a presence of interaction with the one or more physical inputs of the mobile device; and
disable the microphone operatively coupled to the mobile device.

14. The mobile device of claim 13, wherein the first data from the first sensor comprises: short-range wireless communication data connecting the vehicle with the mobile device indicating that the mobile device is located within the vehicle or audible data indicating that the mobile device is located within the vehicle.

15. The mobile device of claim 13, wherein the second data from the second sensor comprises: communication data connecting the vehicle with the mobile device indicating a speed of the vehicle or communication data connecting the vehicle with the mobile device indicating that the engine of the vehicle is running.

16. The mobile device of claim 13, wherein the third data from the third sensor comprises: short-range wireless communication data connecting the vehicle with the mobile device indicating the absence of interaction with the one or more physical inputs of the mobile device or self-sensing data received from the mobile device indicating the absence of interaction with the one or more physical inputs of the mobile device.

17. A non-transitory computer-readable medium comprising instructions configured to cause at least one computer processor to perform a method comprising:
receiving first data from a first sensor;
determining from the first data that the mobile device is located within a vehicle;
receiving second data from a second sensor;
determining from the second data that the vehicle is moving;
receiving third data from a third sensor;
determining from the third data an absence of interaction with one or more physical inputs of the mobile device;
receiving an indication of an incoming telephonic communication being received by the mobile device;
automatically activating a microphone operatively coupled to the mobile device;
receiving one or more voice commands, the one or more voice commands including a command to connect the incoming telephonic communication;
connecting the incoming telephonic communication via the microphone;
receiving an indication that the mobile device disconnected the incoming telephonic communication;
determining from the third data a presence of interaction with the one or more physical inputs of the mobile device; and
disabling the microphone operatively coupled to the mobile device.

18. The non-transitory computer-readable medium of claim 17, wherein the first data from the first sensor comprises: short-range wireless communication data connecting the vehicle with the mobile device indicating that the mobile device is located within the vehicle or audible data indicating that the mobile device is located within the vehicle.

19. The non-transitory computer-readable medium of claim 17, wherein the second data from the second sensor comprises: communication data connecting the vehicle with the mobile device indicating a speed of the vehicle or communication data connecting the vehicle with the mobile device indicating that the engine of the vehicle is running.

20. The non-transitory computer-readable medium of claim 17, wherein the third data from the third sensor comprises: short-range wireless communication data connecting the vehicle with the mobile device indicating the absence of interaction with the one or more physical inputs of the mobile device or self-sensing data received from the mobile device indicating the absence of interaction with the one or more physical inputs of the mobile device.

* * * * *